Sept. 23, 1924.
A. C. TULIUS ET AL
1,509,216
FRUIT GRADING MACHINE
Filed April 8, 1924  3 Sheets—Sheet 1
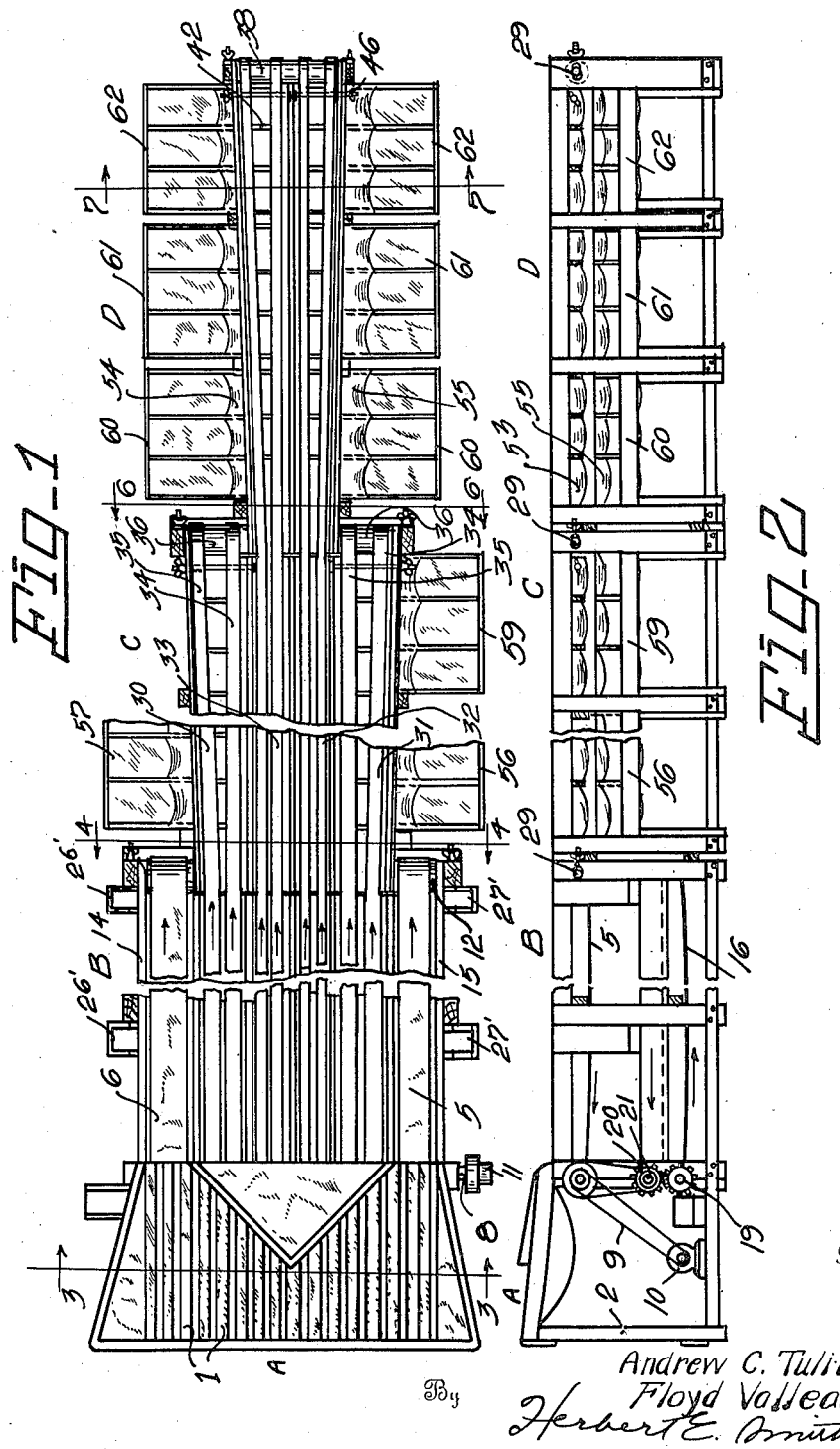
Inventor.
Andrew C. Tulius
Floyd Valleau
By Herbert E. Smith
Attorney

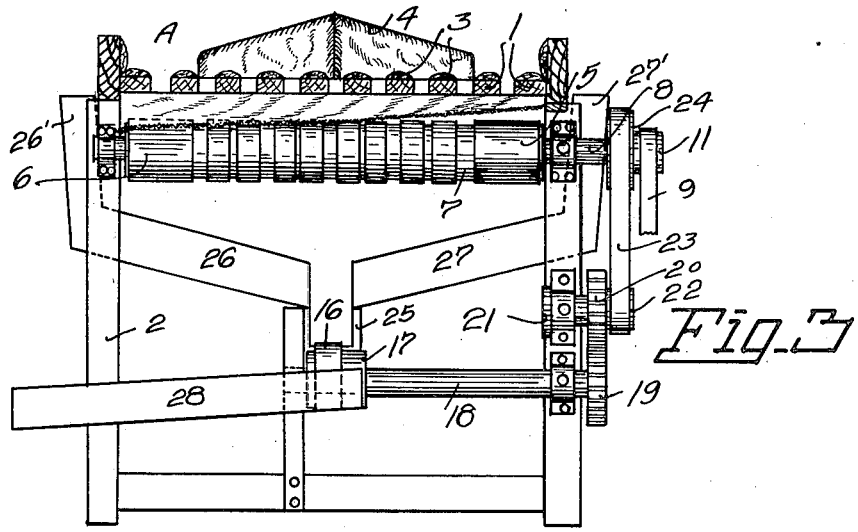
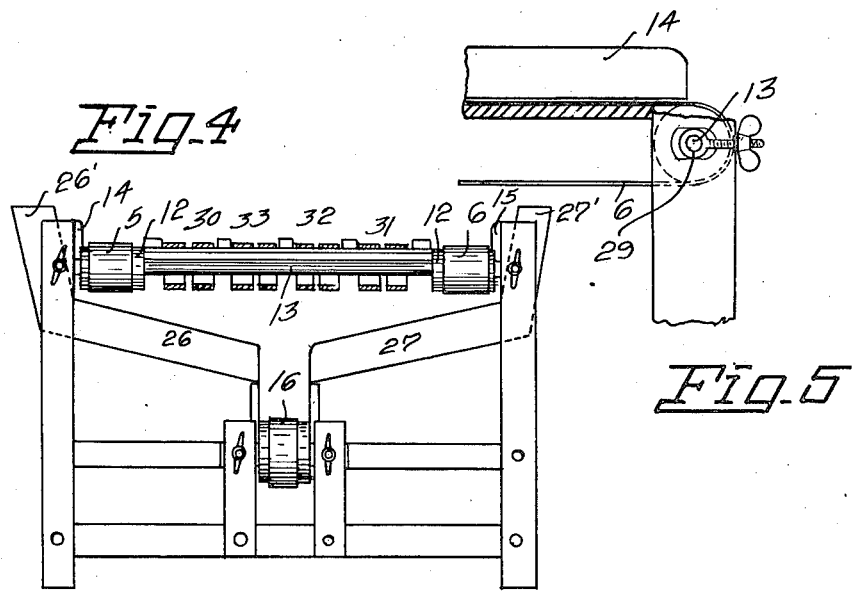

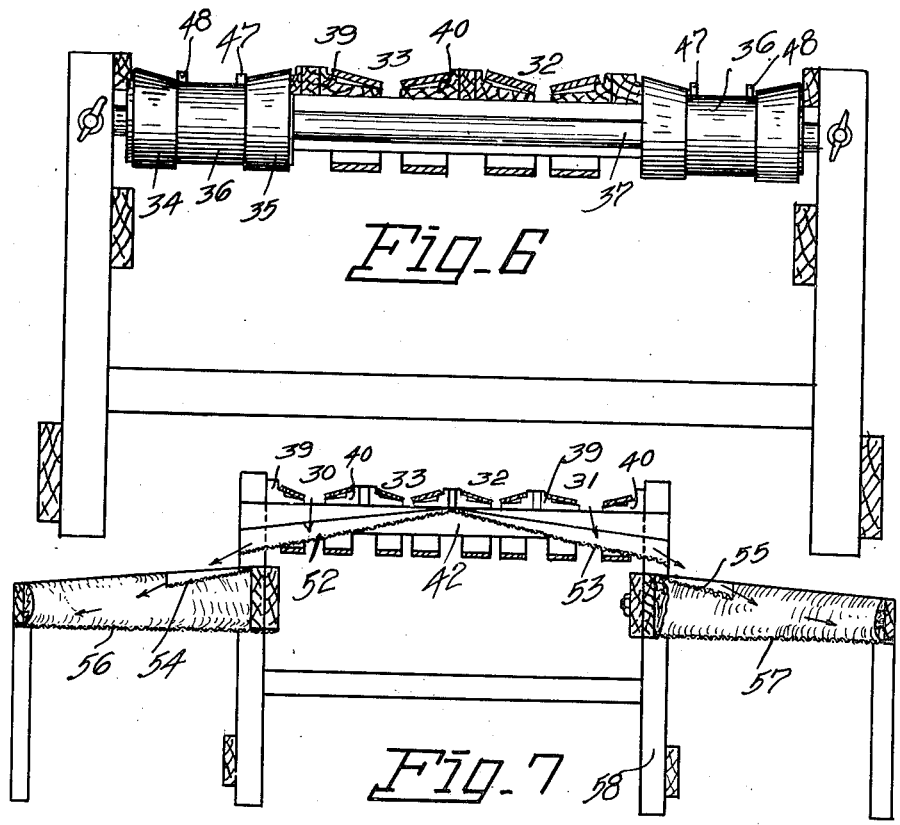
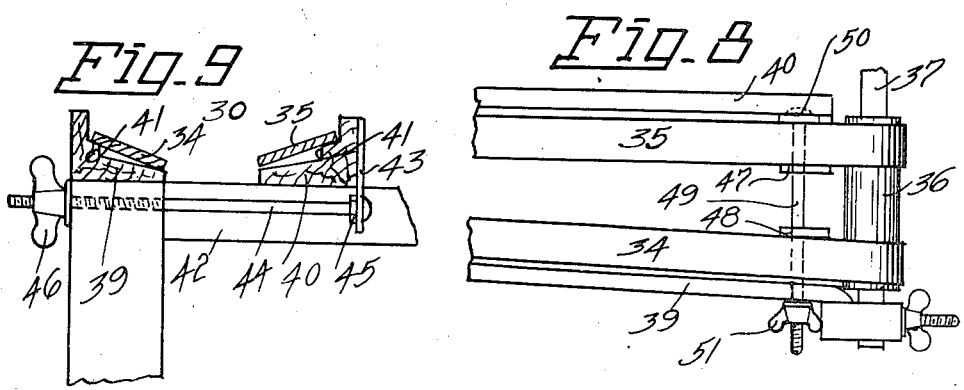

Patented Sept. 23, 1924.

1,509,216

UNITED STATES PATENT OFFICE.

ANDREW C. TULIUS AND FLOYD VALLEAU, OF ELK, WASHINGTON, ASSIGNORS OF ONE-THIRD TO WILLIAM KROLL, OF SPOKANE, WASHINGTON.

FRUIT-GRADING MACHINE.

Application filed April 8, 1924. Serial No. 704,946.

*To all whom it may concern:*

Be it known that we, ANDREW C. TULIUS and FLOYD VALLEAU, citizens of the United States, residing at Elk, in Spokane County and State of Washington, have invented certain new and useful Improvements in Fruit-Grading Machines, of which the following is a specification.

The present invention relates to improvements in fruit grading machines especially adapted for use in connection with the grading of apples, oranges and similar fruits, as to size and class or quality.

The primary object of the invention is the provision of a power operated machine for conveying the fruit, with which machine are utilized the services of attendants or pickers, in distributing the fruit to various conveyers whereby the culls are first eliminated and then the desired fruit is uniformly separated and deposited in complementary receptacles where the operation of sorting may proceed. By the utilization of the principles of the invention a machine of simple construction and operation is provided which is capable of large capacity in handling the fruit, and by means of which the fruit may be quickly and accurately graded.

The invention consists in certain novel combinations and arrangements of parts involving the use of a plurality of conveyer belts arranged in pairs and disposed in predetermined relation to successively arranged receptacles whereby the culls are first separated and then the various grades of fruit, with manual assistance, are automatically deposited in the proper sorting receptacles. And the invention further consists in details of construction for adjusting and guiding the conveyer belts, and in the relative arrangement of the fruit receptacles, as will hereinafter be more fully pointed out and claimed.

In the accompanying drawings one example of the physical embodiment of the invention is illustrated wherein the parts are combined and arranged in accordance with the best mode so far devised for the practical application of the principles of the invention.

Figure 1 is a top plan view of a fruit grading machine according to the invention, parts being broken away for convenience of illustration.

Figure 2 is a view in side elevation of the machine.

Figure 3 is an enlarged, transverse vertical sectional view of the machine through the feed hopper as at line 3—3 of Figure 1.

Figure 4 is a transverse vertical sectional view at line 4—4 of Figure 1 showing especially the chutes and conveyer for the culls.

Figure 5 is a detail longitudinal sectional view showing a belt adjusting device or belt tightener used throughout the machine.

Figure 6 is a transverse vertical sectional view at line 6—6 of Figure 1 showing the guiding means for the conveyers or grading belts.

Figure 7 is a transverse vertical sectional view at line 7—7 of Figure 1 showing the relation of the transverse distributing chutes to the longitudinal conveyers, and also the laterally disposed sorting receptacles for the graded fruit.

Figure 8 is a detail plan view of one of the adjusting devices for spreading or separating the diverging belts of a pair.

Figure 9 is a detail transverse sectional view showing the guides for inwardly tilting the complementary belts of a pair to form a conveyer trough.

A duplex machine is illustrated on the drawings whereby the fruit is received at and fed from a hopper A and distributed from this hopper to opposite sides of the longitudinally disposed machine which includes a distributing section B and successive sorting sections C and D, these parts being indicated as a whole in Figures 1 and 2. The fruit is conveyed by means of pairs of belts forming conveyer troughs and the belts of each pair are separated to permit passage therebetween of fruit which fruit is conveyed by transversely disposed chutes to laterally arranged sorting bins or receptacles, as will be described.

The hopper A at the front end of the machine includes spaced bars 1 arranged parallel with the longitudinal center of the machine and supported on the frame indicated as a whole by the numeral 2. To prevent bruising of the fruit these bars are padded as at 3, and a centrally arranged shield 4 having angularly disposed faces is also padded and is utilized to direct the fruit, rolling thereto from the inclined hopper bars, to the distributing conveyers at the respective sides of the machine.

These distributing conveyers are endless belts 5 and 6 of suitable material and width, which are supported at one end on a long, transversely disposed roller 7 on the main shaft 8 journaled beneath the hopper, and which shaft is driven by belt 9 from the motor 10 through pulley as 11 on the main shaft. At the other ends of these belts they are supported on rollers 12 of the transversely arranged shaft 13, and these belts are of sufficient length to permit the attendants standing adjacent thereto ample time for disposing of all the fruit on the belts before reaching the rollers 12. Guide rails 14 and 15 at the sides of and parallel with these distributing belts are utilized to prevent lateral displacement of the fruit as it is carried by the belts.

Near the bottom of the machine frame is supported a conveyer belt 16 for culls, the upper flight of which carries the culls toward the front of the machine, and the conveyer which extends longitudinally of the machine is disposed centrally thereof. The cull conveyer belt is supported on rollers 17 one of which is fixed on the shaft 18 and the shaft is driven by gears 19 and 20, the latter on a stud shaft 21. The stud shaft is driven through its pulley 22, belt 23 and a driving pulley 24 on the main shaft 8. At the sides of the cull conveyer-belt are located stationary guide rails 25, which together with the conveyer belt form a trough for the culls. The culls (or undesirable fruit) are picked from the distributing belts or conveyers 5 and 6 by the attendants and dropped into transversely arranged, oppositely disposed inclined chutes 26 and 27 and 26' and 27' through which they roll to the cull conveyer. From the front end of the cull conveyer the culls are dropped into a transversely arranged discharge chute 28 and disposed of in suitable manner.

In Figure 5 at 29 an adjustable bearing is illustrated for the shaft 18, and a similar bearing is provided for each of the endless belts of the machine by means of which the belts may be adjusted for properly performing their functions.

The attendants or fruit pickers stationed at each side of the machine, in addition to picking out the culls, also pick up the desirable fruit and distribute it to the longitudinally disposed conveyers, four of which are here illustrated as 30, 31, 32 and 33. The outside conveyers 30 and 31 at opposite sides of the machine terminate at a suitable point and the intermediate conveyers 32 and 33 extend beyond this point and carry the fruit beyond the point of deposit of the outside conveyers, thus permitting a compact and convenient arrangement of parts of the machine.

Each of the above indicated conveyers comprises a pair of endless belts, of suitable material and of proper length, indicated by the numerals 34 and 35, which pass over short rollers 36 spaced apart on the shaft 37 for the outside conveyers 30 31, and the front ends of these belts pass around the long driving roller 7 at the front of the machine, said roller being driven as described from the motor 10. The intermediate conveyer-belts which also pass around the main roller 7 are supported at the rear end of the machine on spaced rollers 38, and of course the fruit is carried by the upper flights of these conveyer-belts toward the rear end of the machine.

As best seen in Figure 9 the machine is provided with longitudinally extending guide boards 39 and 40 arranged in pairs, one pair for each conveyer 30, 31, 32, 33, and the upper faces of these boards are fashioned with shoulders or ribs 41 which support the upper or working flights of the belts in a tilted position to insure a trough formation for the fruit traveling thereon.

These conveyer supports or guides 39 and 40 are supported on transversely disposed bars 42 of the machine frame, and one guide as 40 of each pair of guides, is laterally adjustable with relation to its complementary guide for the purpose of spacing the belts apart. For this purpose a plate as 43 is fixed to the adjustable guide, and a bolt 44 is fixed in the plate. The bolt extends laterally of the machine and is supported in a portion of the frame thereof. At one end the bolt is fixed to the plate as at 45, and the free end of the bolt projecting through the frame is equipped with a wing nut 46 which permits adjustment of the guide board 40 and when so adjusted holds the board in position.

The conveyer belts, which are spread apart to permit the fruit to drop therebetween may be spread apart or adjusted by means illustrated in Figure 8 where two spreader plates 47 and 48 are located at the inner edges of the belts 34 and 35 and operated by a screw bar 49 to spread the belts, the end 50 of the bar being fixed and the free end of the bar being provided with an adjusting nut 51. By this means the belts may be spread apart, and in conjunction with the adjusting bar in Figure 9, the belts may be relatively spaced to proper positions for permitting passage between them of the fruit.

The conveyer belts are thus arranged in diverging pairs so that the largest apples for instance will travel with the pair of belts the greatest distance before they fall or drop between the belts of the pair, and the smaller apples will drop through the conveyers at intermediate points between the hopper and the far end of the machine.

Thus at points along the length of the conveyer-grading belts the fruit is dropped through these grading devices and received in downwardly extending or inclined chutes as 52 and 53 shown in Figure 7. These chutes are disposed transversely of the machine with their higher ends at the longitudinal center of the machine and their lower ends terminating at the sides of the machine under the longitudinal conveyers, or rather between the upper and lower flights of the conveyer belts.

From the outer, lower ends of the chutes 52 and 53, the fruit rolls to a declining apron 54 or 55 supported at the side of the machine above a sorting bin or receptacle as 56 or 57. These bins are properly supported at the sides of the machine as by legs or framework 58 and are properly padded to prevent bruising of the fruit. Bins 59, 60, 61 and 62 are also utilized for receiving fruit from the longer conveyers and the fruit is transferred from the conveyers to these bins as above described. After the apples have been deposited in the bins they may be sorted by the attendants for packing and shipping.

The number and length of the conveyers may be varied, and the complementary units comprising the sorting bins may be increased or diminished accordingly, and the adjustable conveyers may be adjusted as desired for grading the apples according to size. The personal attention of the attendants or pickers is utilized in connection with automatic grading of the fruit to insure uniformity and the proper operation of the machine.

Having thus fully described the invention, what we claim herein is—

1. In a fruit grading machine, the combination with a pair of endless belts and operating means therefor, of a pair of guide boards for said belts each having a longitudinal rib for inwardly tilting the upper flights of said belts to form a trough, means for relatively adjusting said guide boards, and means for engaging the inner edges of said belts to spread them to permit various sizes of fruit to fall therebetween.

2. In a fruit grading machine the combination with a main frame a pair of endless belts and operating means therefor, of a pair of guide members for said belts having complementary inclined faces whereby the upper flights of the belts are formed as a trough, means for relatively adjusting the guide members, a pair of spreader plates engaging adjoining inner edges of said belts, and a spreader bolt supported in the main frame for operating said plates.

3. In a fruit grading machine the combination with a main frame and a pair of endless belts and operating means therefor, of a fixed guide member and a relatively adjustable guide member for said belts having longitudinal ribs for inwardly tilting the upper flights of said belts to form a trough, a plate attached to the adjustable guide member, a bolt fixed in said plate and having a bearing in the frame, and an adjusting nut on the bolt.

In testimony whereof we affix our signatures.

ANDREW C. TULIUS.
FLOYD VALLEAU.